(12) United States Patent
Schubert

(10) Patent No.: US 7,831,423 B2
(45) Date of Patent: Nov. 9, 2010

(54) REPLACING TEXT REPRESENTING A CONCEPT WITH AN ALTERNATE WRITTEN FORM OF THE CONCEPT

(75) Inventor: Kjell Schubert, Pittsburg, PA (US)

(73) Assignee: Multimodal Technologies, Inc., Pittsburgh, PA (US)

( * ) Notice: Subject to any disclaimer, the term of this patent is extended or adjusted under 35 U.S.C. 154(b) by 939 days.

(21) Appl. No.: 11/440,950

(22) Filed: May 25, 2006

(65) Prior Publication Data

US 2007/0276649 A1 Nov. 29, 2007

(51) Int. Cl.
*G10L 17/00* (2006.01)

(52) U.S. Cl. ...................................... 704/247; 704/252

(58) Field of Classification Search ................. 704/247, 704/252

See application file for complete search history.

(56) References Cited

U.S. PATENT DOCUMENTS

| | | |
|---|---|---|
| 4,459,049 A | 7/1984 | Howell et al. |
| 4,650,349 A | 3/1987 | Westreich |
| 4,760,528 A | 7/1988 | Levin |
| 4,994,968 A | 2/1991 | Kato et al. |
| 5,634,084 A | 5/1997 | Malsheen et al. |
| 5,706,450 A | 1/1998 | Shaiman et al. |
| 5,761,689 A | 6/1998 | Rayson et al. |
| 5,809,476 A | 9/1998 | Ryan |
| 5,864,805 A | 1/1999 | Chen et al. |
| 5,873,660 A | 2/1999 | Walsh et al. |
| 6,041,292 A * | 3/2000 | Jochim ........................... 704/3 |
| 6,122,613 A * | 9/2000 | Baker ........................... 704/235 |
| 6,122,614 A * | 9/2000 | Kahn et al. ................. 704/235 |
| 6,292,771 B1 * | 9/2001 | Haug et al. ..................... 704/9 |
| 6,347,296 B1 | 2/2002 | Friedland |
| 6,418,410 B1 | 7/2002 | Nassiff et al. |
| 6,789,231 B1 | 9/2004 | Reynar et al. |
| 7,231,343 B1 * | 6/2007 | Treadgold et al. ............... 704/9 |
| 2002/0046032 A1 | 4/2002 | Wutte |
| 2002/0138265 A1 | 9/2002 | Stevens et al. |

FOREIGN PATENT DOCUMENTS

| | | |
|---|---|---|
| EP | 1 365 349 A2 | 11/2003 |
| WO | PCT/US99/11713 | 12/1999 |

OTHER PUBLICATIONS

Michael Krauthammer and Goran Nenadic, "Term Identification in the Biomedical Literature," Journal of Biomedical Informatics, vol. 37, Issue 6, Dec. 2004, pp. 512-526, Elsevier.

\* cited by examiner

*Primary Examiner*—Michael N Opsasnick
(74) *Attorney, Agent, or Firm*—Robert Plotkin, P.C.

(57) ABSTRACT

A system enables a transcriptionist to replace a first written form (such as an abbreviation) of a concept with a second written form (such as an expanded form) of the same concept. For example, the system may display to the transcriptionist a draft document produced from speech by an automatic speech recognizer. If the transcriptionist recognizes a first written form of a concept that should be replaced with a second written form of the same concept, the transcriptionist may provide the system with a replacement command. In response, the system may identify the second written form of the concept and replace the first written form with the second written form in the draft document.

17 Claims, 11 Drawing Sheets

Editor

File  Table  Help appreciated measuring 3 cm in size.

Past Medical History

○ Chronic obstructive pulmonary disease.

○ Right inguinal hernia repair in the past.

○ Cerebrovascular accident in 2002 — 904

902a

Current Medications

Editor

File Table Help

Past Medical History
- Chronic obstructive pulmonary disease.
- Right inguinal hernia repair in the past.
- Cerebrovascular accident in 2002 — 902c Current Medications 900c

REPLACING TEXT REPRESENTING A CONCEPT WITH AN ALTERNATE WRITTEN FORM OF THE CONCEPT

CROSS REFERENCE TO RELATED APPLICATIONS

This application is related to the following commonly-owned U.S. patent applications, hereby incorporated by reference:

U.S. patent application Ser. No. 10/923,517, filed on Aug. 20, 2004, entitled, "Automated Extraction of Semantic Content and Generation of a Structured Document from Speech"; and U.S. patent application Ser. No. 11/269,094, entitled, "Automatic Detection and Application of Editing Patterns in Draft Documents."

BACKGROUND

1. Field of the Invention

The present invention relates to text processing and, more particularly, to editing text in draft documents.

2. Related Art

It is desirable in many contexts to generate a structured textual document based on human speech. In the legal profession, for example, transcriptionists transcribe testimony given in court proceedings and in depositions to produce a written transcript of the testimony. Similarly, in the medical profession, transcripts are produced of diagnoses, prognoses, prescriptions, and other information dictated by doctors and other medical professionals. Transcripts in these and other fields typically need to be highly accurate (as measured in terms of the degree of correspondence between the semantic content (meaning) of the original speech and the semantic content of the resulting transcript) because of the reliance placed on the resulting transcripts and the harm that could result from an inaccuracy (such as providing an incorrect prescription drug to a patient).

It may be difficult to produce an initial transcript that is highly accurate for a variety of reasons, such as variations in: (1) features of the speakers whose speech is transcribed (e.g., accent, volume, dialect, speed); (2) external conditions (e.g., background noise); (3) the transcriptionist or transcription system (e.g., imperfect hearing or audio capture capabilities, imperfect understanding of language); or (4) the recording/transmission medium (e.g., paper, analog audio tape, analog telephone network, compression algorithms applied in digital telephone networks, and noises/artifacts due to cell phone channels).

The first draft of a transcript, whether produced by a human transcriptionist or an automated speech recognition system, may therefore include a variety of errors. Typically it is necessary to proofread and edit such draft documents to correct the errors contained therein. Transcription errors that need correction may include, for example, any of the following: missing words or word sequences; excessive wording; mis-spelled, -typed, or -recognized words; missing or excessive punctuation; and incorrect document structure (such as incorrect, missing, or redundant sections, enumerations, paragraphs, or lists).

In some circumstances, however, a verbatim transcript is not desired. In fact, transcriptionists may intentionally introduce a variety of changes into the written transcription. A transcriptionist may, for example, filter out spontaneous speech effects (e.g., pause fillers, hesitations, and false starts), discard irrelevant remarks and comments, convert data into a standard format, insert headings or other explanatory materials, or change the sequence of the speech to fit the structure of a written report.

Furthermore, formatting requirements may make it necessary to edit even phrases that have been transcribed correctly so that such phrases comply with the formatting requirements. For example, abbreviations and acronyms may need to be fully spelled out. This is one example of a kind of "editing pattern" that may need to be applied even in the absence of a transcription error.

Such error correction and other editing is typically performed by human proofreaders and can be tedious, time-consuming, costly, and itself error-prone. Although various techniques have been developed which attempt to automatically detect and correct errors in draft documents, such techniques typically attempt to produce documents which are as close to verbatim transcripts of the source speech as possible. Such techniques, therefore, are of little or no use for making corrections or other changes for the purpose of producing documents that are not verbatim transcripts of the source speech.

SUMMARY

Techniques are disclosed for enabling a transcriptionist to replace a first written form (such as an abbreviation) of a concept with a second written form (such as an expanded form) of the same concept. For example, the system may display to the transcriptionist a draft document produced from speech by an automatic speech recognizer. If the transcriptionist recognizes a first written form of a concept that should be replaced with a second written form of the same concept, the transcriptionist may provide the system with a replacement command. In response, the system may identify the second written form of the concept and replace the first written form with the second written form in the draft document.

One aspect of the present invention is directed to a computer-implemented method comprising: (A) identifying a first phrase, the first phrase representing a first written form of a concept; (B) identifying a two-way mapping between the first phrase and a second phrase, the second phrase representing a second written form of the concept; and (C) replacing the first phrase with the second phrase.

Another aspect of the present invention is directed to a computer-implemented method comprising: (A) identifying a first phrase, the first phrase representing a first written form of a concept; (B) determining whether a plurality of text keys includes a matching text key having at least a predetermined degree of similarity to the first phrase; and (C) if the plurality of text keys is determined to include the matching text key, then: (C)(i) identifying a text value associated with the text key; and (C)(ii) replacing the first phrase with the text value.

A further aspect of the present invention is directed to a computer-implemented method comprising: (A) identifying a first phrase, the first phrase representing an expanded written form of a concept; (B) receiving an instruction from a user to modify the first phrase; (C) in response to receipt of the instruction, identifying a second phrase representing an abbreviated written form of the concept; and (D) replacing the first phrase with the second phrase; wherein the instruction does not include the second phrase.

Yet another aspect of the present invention is directed to a computer-implemented method comprising: (A) generating a document using an automatic speech recognizer; (B) receiving an instruction from a user to modify a first phrase in the document, the first phrase representing a first written form of a concept; (C) identifying a two-way mapping between the first phrase and a second phrase, the second phrase representing a second written form of the concept; and (D) in response to receipt of the instruction, replacing the first phrase with the second phrase in the document.

Other features and advantages of various aspects and embodiments of the present invention will become apparent from the following description and from the claims.

BRIEF DESCRIPTION OF THE DRAWINGS

FIGS. 9A-9C are illustrations of graphical user interfaces provided by embodiments of the present invention for replacing one written form of a concept with another.

DETAILED DESCRIPTION

Figure 1:
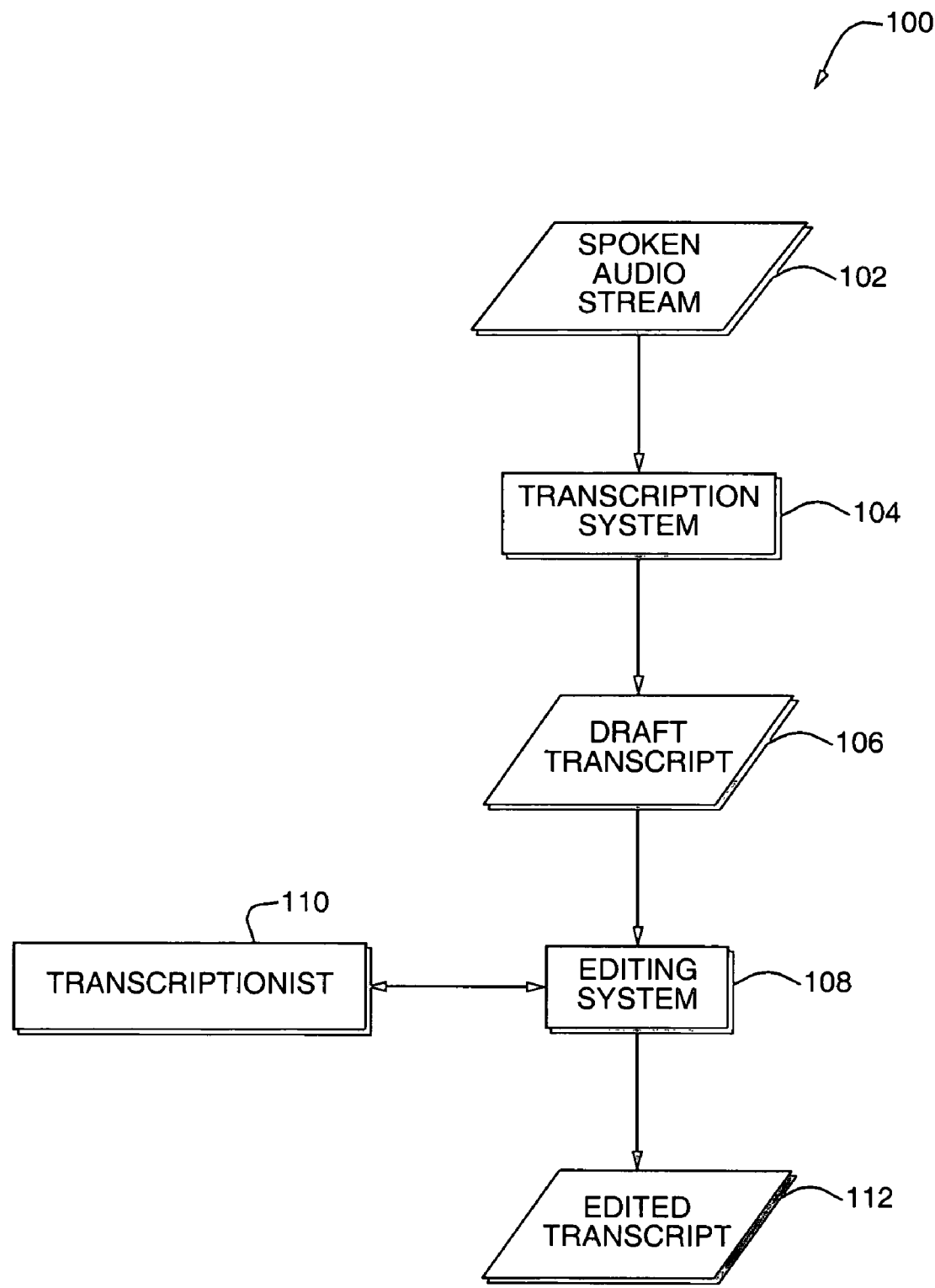
FIG. 1 is a dataflow diagram of a system for replacing a first written form of a concept with a second written form of the concept in a draft document according to one embodiment of the present invention.

As described above, various techniques have been developed which attempt to automatically detect and correct errors in draft documents, with the intent of producing a document which is as close to a verbatim transcript of the source speech as possible. In some circumstances, however, it is desirable to produce a document which is not necessarily a verbatim transcript of the source speech. For example, a medical transcriptionist may be required to transcribe a dictated medical report into a document having a particular format that is dictated by law or policy. The mandatory document format may require, for example, that certain terms be transcribed using prescribed abbreviations (e.g., acronyms), regardless of the form in which such terms were dictated. In such an example, the transcriptionist may need to produce documents which are not verbatim transcripts of the source speech from which the documents are produced.

Consider an example in which an automatic speech recognizer produces a draft transcript of a dictated medical report. FIG. 9A is an illustration of such a draft transcript, as it may be rendered in a window 900a of a text editor. A medical transcriptionist is assigned to review and edit the draft transcript to produce a final transcript or other report based on the dictation. Now assume that the draft transcript includes the phrase "cerebrovascular accident" (illustrated by text 904), which is a verbatim transcription of the phrase dictated by the doctor. Further assume, however, that the medical transcriptionist is required to use the abbreviation "CVA" in the transcript in place of the expanded form "cerebrovascular accident." Such an abbreviation may be required, for example, by the format of the particular report being produced by the transcriptionist.

The medical transcriptionist could make the draft document comply with the required report format by manually deleting the phrase "cerebrovascular accident" and manually typing "CVA" in its place. This solution, however, would be tedious and time-consuming.

Alternatively, the medical transcriptionist could use a global "search and replace" command to replace all instances of "cerebrovascular accident" with "CVA". But making such modifications in this way has a number of disadvantages. For example, it may be desirable or necessary for the transcriptionist to edit the draft transcript serially, in other words, by reviewing the transcribed text in sequence and making modifications as they are observed. The medical transcriptionist may, for example, edit the draft transcript while listening to a recording of the source speech. A global "search and replace" command would make modifications to the document out of sequence, thereby breaking the flow of the editing process.

Furthermore, a global "search and replace" command might actually introduce errors into the draft transcript. For example, it might be necessary to use the phrase "cerebrovascular accident" in certain sections of the document and "CVA" in other sections of the document. Simply replacing all instances of "cerebrovascular accident" with "CVA" would produce a result inconsistent with such a report format, thereby requiring further review and editing by the medical transcriptionist.

In summary, one problem faced by the medical transcriptionist is that a draft transcript may contain an expanded written form (e.g., "cerebrovascular accident") of a particular concept when an abbreviated written form (e.g., "CVA") is needed or desired, and that the transcript may contain the abbreviated written form of the concept when the expanded written form is needed or desired. It may be difficult or impossible to provide an automated system for consistently producing the correct written form because, for example, the correct choice of written form (e.g., expanded or abbreviated) may depend on context. As a result, it is desirable to provide the medical transcriptionist with a system that simplifies and at least partially automates the process of replacing one written form of a concept with another.

Figure 2:
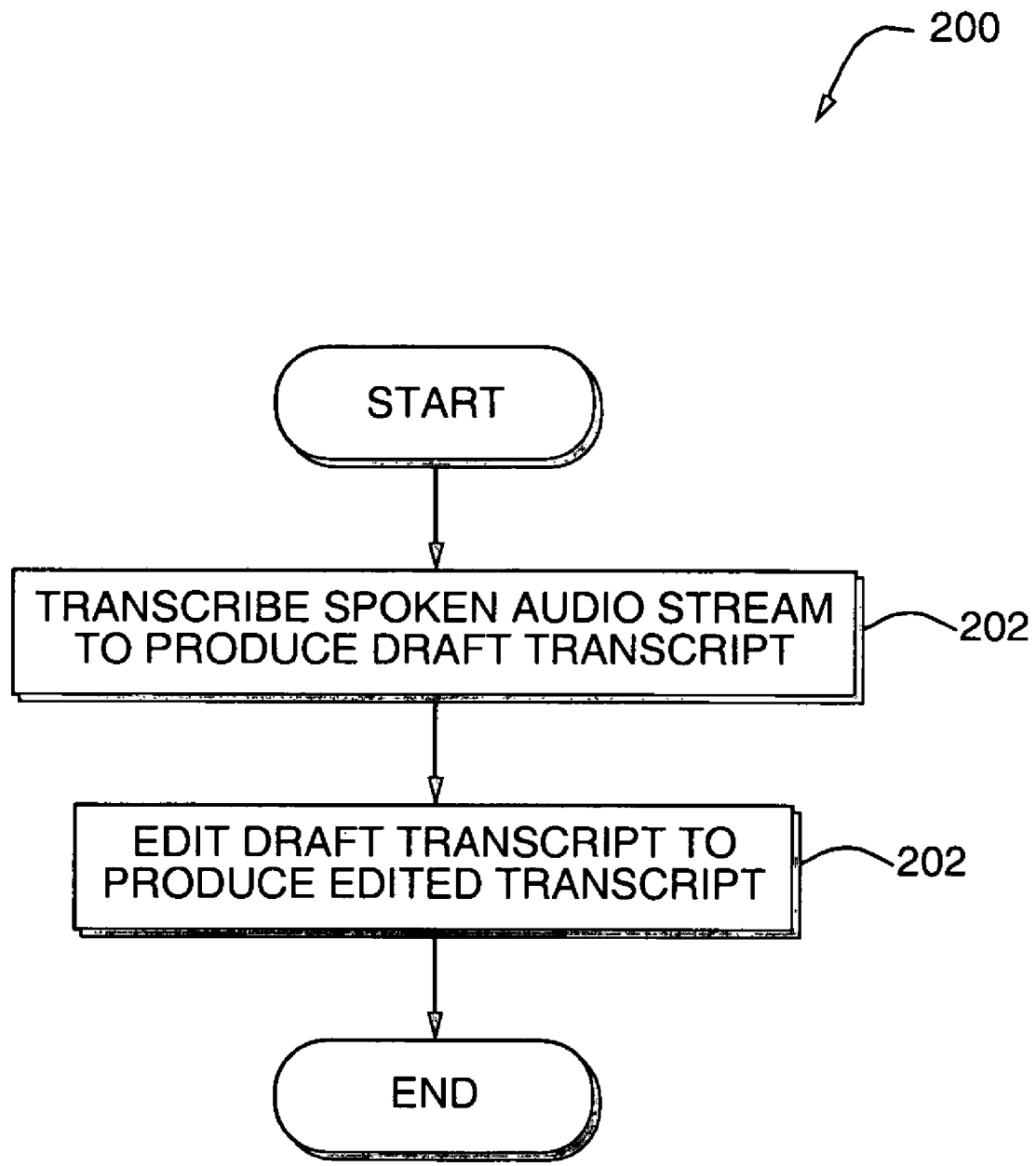
FIG. 2 is a flowchart of a method performed by the system of FIG. 1 according to one embodiment of the present invention.

Referring to FIG. 1, a dataflow diagram is shown of a system 100 for providing such a solution according to one embodiment of the present invention. Referring to FIG. 2, a flowchart is shown of a method 200 performed by the system 100 of FIG. 1 according to one embodiment of the present invention. In general, an automatic transcription system 104 produces a draft transcript 106 of a spoken audio stream 102 (FIG. 2, step 202). A transcriptionist 110 uses an editing system 108 to edit the draft transcript 106, thereby producing an edited transcript 112 (FIG. 2, step 204).

Figure 3:
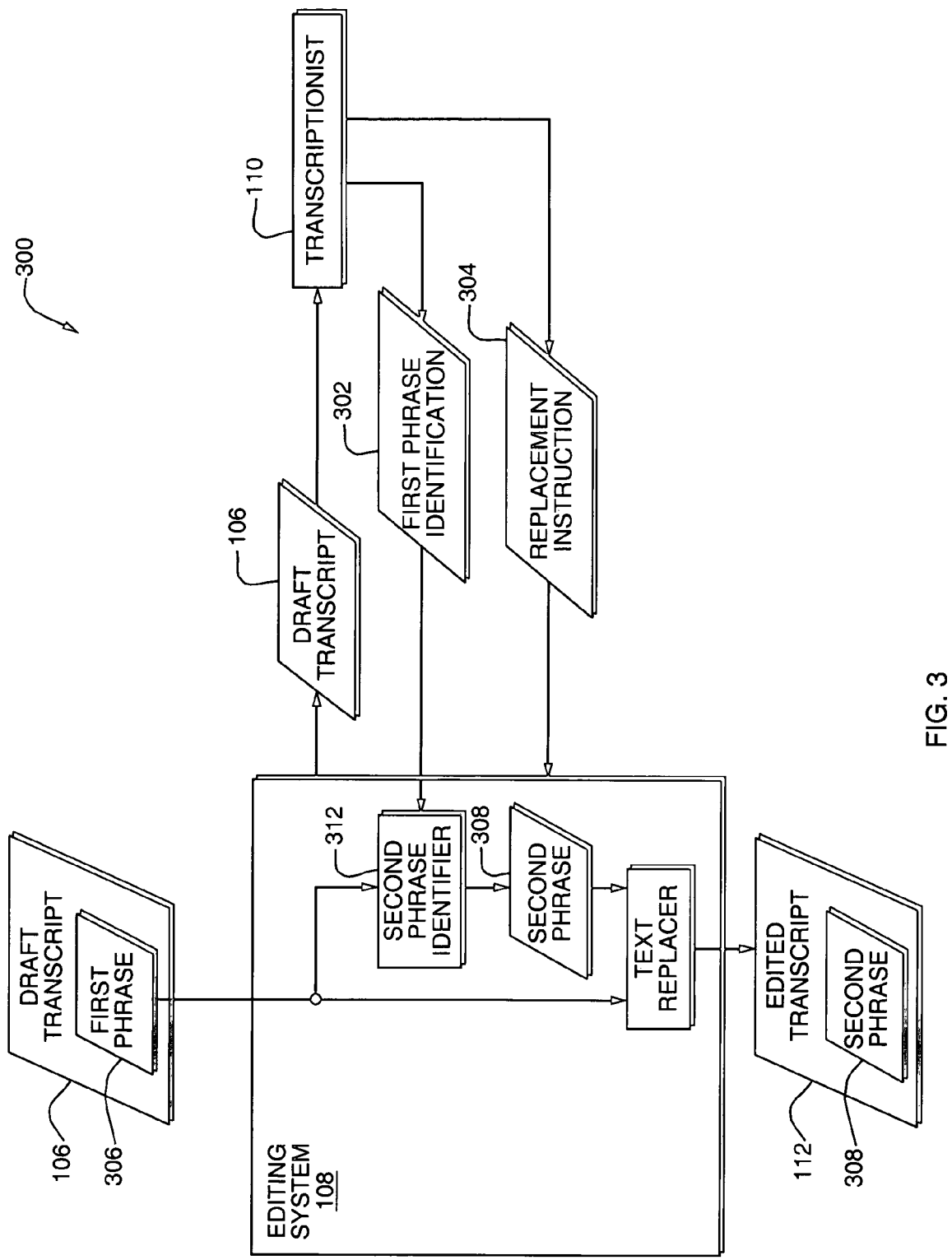
FIG. 3 is a dataflow diagram of a portion of the system of FIG. 1 according to one embodiment of the present invention.
Figure 4:
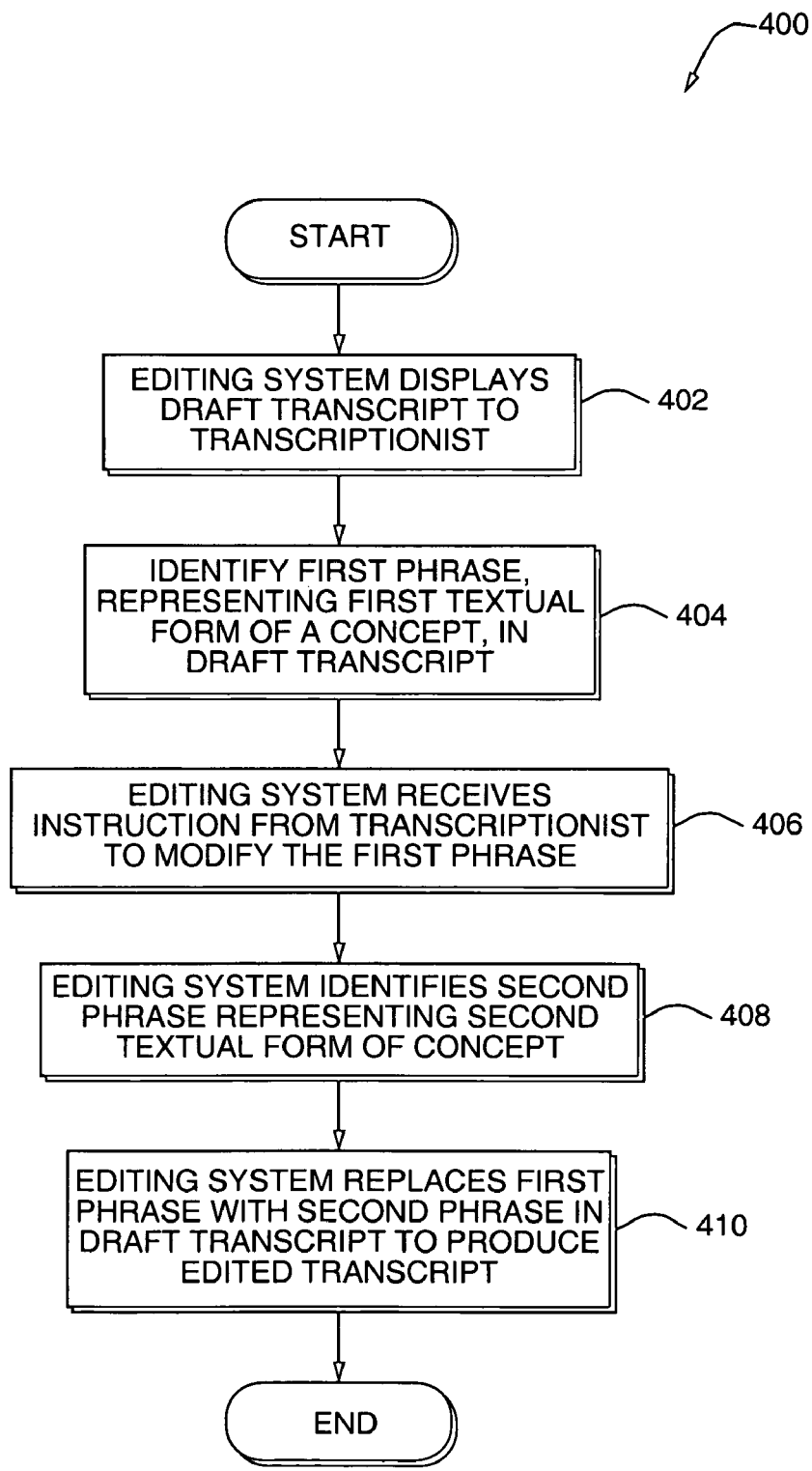
FIG. 4 is a flowchart of a method performed by the system of FIG. 3 according to one embodiment of the present invention.

Referring to FIG. 3, a dataflow diagram is shown of a portion of the system 100 in more detail according to one embodiment of the present invention. Referring to FIG. 4, a flowchart is shown of a method 400 performed by the portion of the system 100 shown in FIG. 4 according to one embodiment of the present invention. The editing system 108 displays the draft transcript 106 to the transcriptionist 110 (FIG. 4, step 402). Referring again to FIG. 9A, an example illustration of the draft transcript 106 is shown, as it may be rendered in a window 900a of the editing system 108.

Although not shown in FIGS. 3-4, the editing system 108 may also play the spoken audio stream 102 to the transcriptionist 110. The editing system 108 may, for example, incrementally display text in the draft transcript 106 as the corresponding speech in the spoken audio stream 102 is played.

A first phrase 306, representing a first written form of a concept, is identified in the draft transcript 106 (step 404). In the following discussion, a cerebrovascular accident will be used as an example of a concept, the text "cerebrovascular accident" will be used as a first (expanded) written form of that concept, and "CVA" will be used as a second (abbreviated) written form of that concept.

The first phrase 306 may be identified in any of a variety of ways. For example, the transcriptionist 110 may identify the first phrase 306 and provide the editing system 108 with input 302 indicating the first phrase 306. The transcriptionist 110 may identify the first phrase 306 by, for example, placing a text cursor within the first phrase 306 in a display of the draft transcript 106, or by highlighting the first phrase 306 in a display of the draft transcript 106. For example, in FIG. 9A the transcriptionist 110 has placed a text cursor 904 immediately after the text representing the first phrase 306 to select the first phase 306.

Alternatively, the editing system 108 may identify the first phrase 306. For example, and as described in more detail below, the editing system 108 may maintain a dictionary of alternate written forms of various concepts. When the editing system 108 displays text in the draft transcript 106 to the transcriptionist 110, the editing system 108 may determine, by reference to the dictionary, whether the displayed text is an alternate written form of a concept. If so, the editing system 108 may identify the text as the first phrase 306 in step 404.

Assume, for example, that the first phrase 306 is "cerebrovascular accident," and that the transcriptionist 110 identifies this phrase by placing a text cursor within or near the phrase while viewing the draft transcript 106. The transcriptionist 110 may identify this phrase because the transcriptionist 110 knows, for example, that the report format applicable to the draft transcript 106 instead requires the phrase "CVA" to be used in the current context.

The transcriptionist 110 provides an instruction 304 to the editing system 108 to modify the identified first phrase 306 (step 406). The instruction 304 may take any of a variety of forms. For example, the transcriptionist 110 may provide the instruction 304 by double-clicking on the first phrase 306 in the draft transcript 106, or by pressing a predetermined key or key combination.

In response to receiving the instruction 304, a second phrase identifier 312 in the editing system 108 identifies a second phrase 308 representing a second written form of the concept (step 408). For example, if the first phrase 306 is "cerebrovascular accident," the second phrase 308 may be "CVA," both of which represent the concept of a cerebrovascular accident. Examples of ways in which the editing system 108 may identify the second phrase 308 are described in more detail below.

The editing system 108 includes a text replacer 310 which replaces the first phrase 306 with the second phrase 308 in the draft transcript 106, thereby producing the edited transcript 112, in which the second phrase 308 substitutes for the first phrase 306 (step 410). Note that steps 404-410 may be repeated for multiple phrases.

Figure 9B:
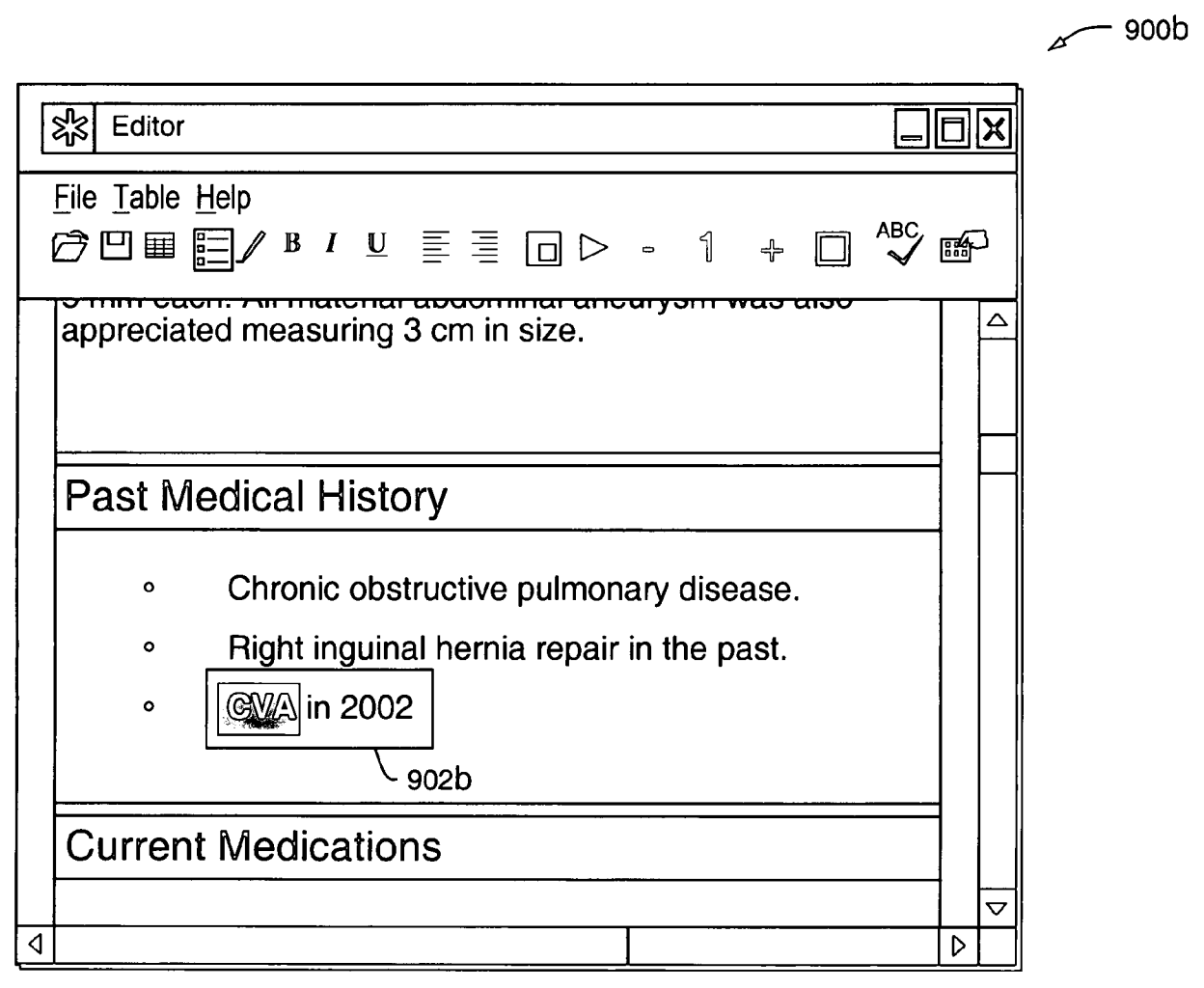

Referring to FIG. 9B, an example illustration of the edited transcript 112 is shown, as it may be rendered in a window 900b of the editing system 108. The rendering shown in FIG. 900b includes text 902b representing the second phrase 308 ("CVA"), which has replaced the first phrase 306 ("cerebrovascular accident"). If the transcriptionist 110 provides the replacement instruction 304 again, the editing system 108 may replace the second phrase 308 with the first phrase 306, as shown in FIG. 9C (in which window 900c includes text 902c representing the first phrase 306).

Figure 5:
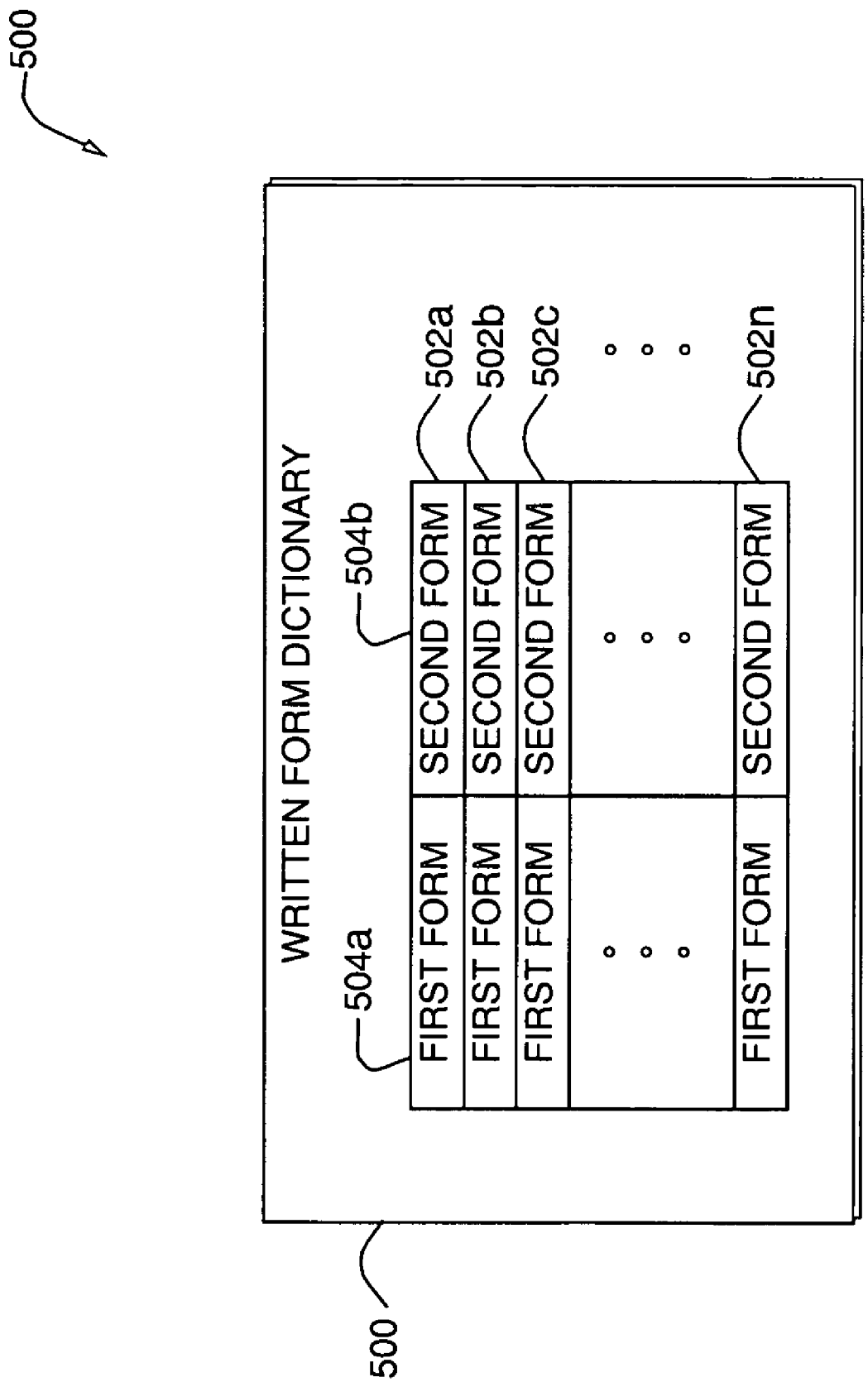
FIG. 5 is a diagram of a written form dictionary for use in embodiments of the present invention.
Figure 6:
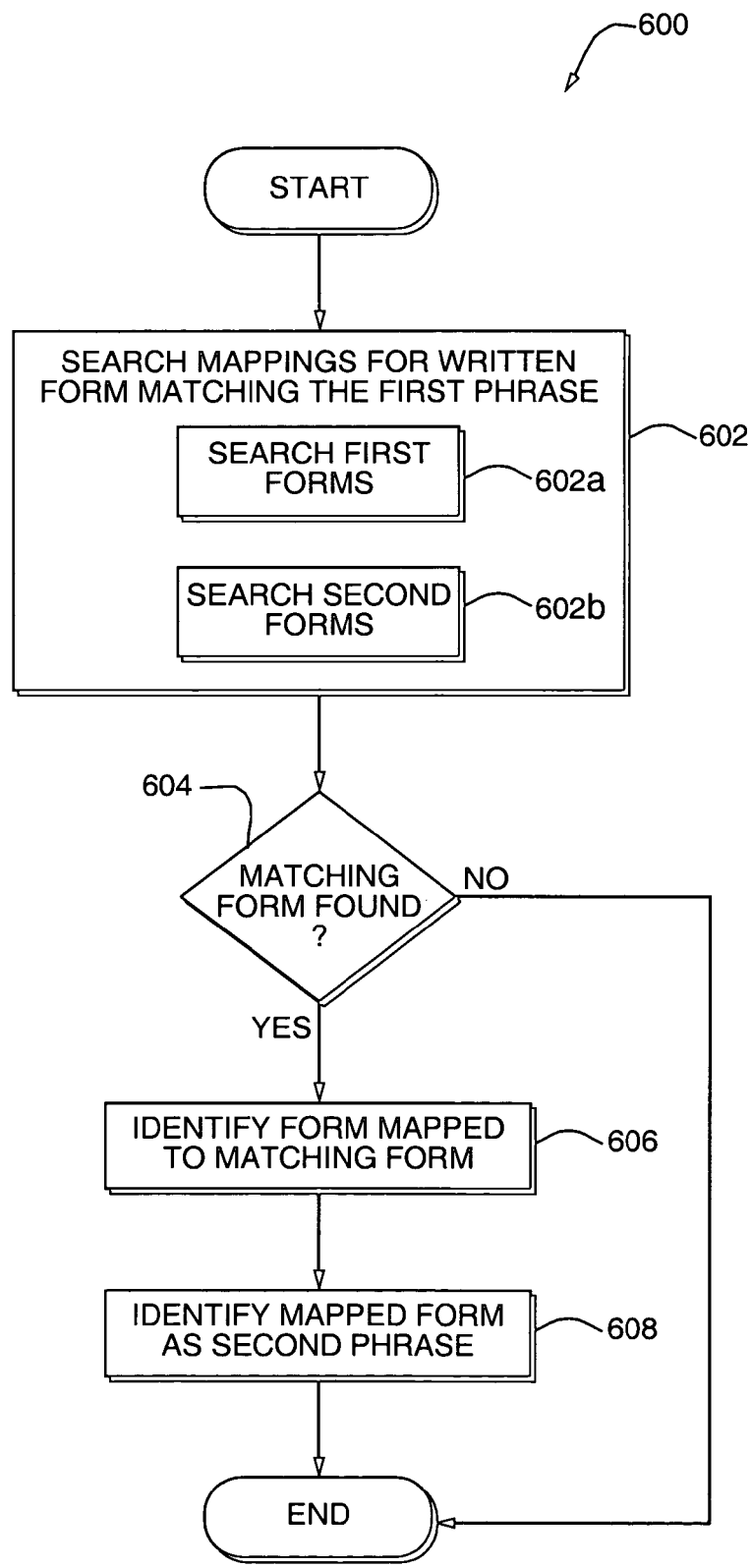
FIG. 6 is a flowchart of a method for using the written form dictionary of FIG. 5 to select replacement text according to one embodiment of the present invention.

As mentioned above, when a first phrase representing a first written form of a concept is identified, the editing system 108 may identify a second phrase representing a second written form of the same concept (FIG. 4, step 408). Referring to FIG. 5, one embodiment of the editing system 108 is shown which identifies the second phrase 308 using a written form dictionary 500. Referring to FIG. 6, a flowchart is shown of a method used by the editing system 108 to identify the second phrase 308 using the written form dictionary 500, and thereby to implement step 408 of FIG. 4, according to one embodiment of the present invention.

In the example shown in FIG. 5, written form dictionary 500 includes individual mappings 502a-n, where n may be any number. Each of the mappings 502a-n corresponds to a concept. For purposes of example, assume that mapping 502a corresponds to the concept of a cerebrovascular accident. Mapping 502b may correspond to a different concept, such as the concept of milligrams (which may be represented, for example, by the alternate written forms "milligrams" and "mg"). More generally, mappings 502a-n map first written forms 504a to second written forms 504b.

Once the first phrase 306 has been identified (FIG. 4, step 404), the editing system 108 may identify the second phrase 308 as follows. The editing system 108 may search the mappings 502a-n in the written form dictionary 500 for a written form that matches the first phrase 306 (step 602). The editing system 108 may search for a written form that exactly matches the first phrase 306. Alternatively, however, a predetermined minimum degree of required similarity may be defined, and the editing system 108 may search for a written form that has at least the predetermined minimum degree of similarity to the first phrase.

The editing system 108 may perform the search by searching the first written forms 504a in the mappings 502a-n (step 602a), the second written forms 504b in the mappings 502a-n (step 602b), or both. If the editing system 108 searches only the first written forms 504a, then the mappings 502a-n are effectively one-way mappings from the first written forms 504a to the second written forms 504b. Similarly, if the editing system 108 searches only the second written forms 504b, then the mappings 502a-n are effectively one-way mappings from the second written forms 504b to the first written forms 504a. If the editing system 108 searches both the first written forms 504a and the second written forms 504b, then the mappings 502a-n are effectively two-way mappings between the first written forms 504a and the second written forms 504b.

If a (sufficiently) matching written form is found in the written form dictionary 500 (step 604), then the editing system 108 identifies the corresponding written form to which the matching written form is mapped (step 606). For example, if one of the first written forms 504a is identified in step 602 as a match for the first phrase 306, then in step 606 the editing system 108 identifies the corresponding one of the second written forms 504b. As a specific example, if the first form 504a of mapping 502a ("cerebrovascular accident") is identified in step 602 as matching the first phrase 306 ("cerebrovascular accident"), then in step 606 the editing system 108 identifies the corresponding second written form 504b of mapping 502a ("CVA"). The editing system 108 then selects the mapped written form as the second phrase 308 (step 608).

As described above with respect to FIG. 4, once the editing system 108 has identified the second phrase 308, the editing system 108 may replace the first phrase 306 with the second phrase 308 in the draft transcript 106, thereby producing the edited transcript 112 (step 410).

Embodiments of the present invention are not limited to mappings between a pair of written forms. A mapping may map three or more written forms, representing the same concept, to each other. Such mappings may be useful, for example, when a single abbreviation (such as "CVA") is an abbreviation for multiple terms (such as "cerebrovascular accident" and "costovertebral angle"). In such a case, if the abbreviation "CVA" appears in the draft transcript 106, it would be useful to provide the transcriptionist 110 with the ability to replace the abbreviation "CVA" with either "cerebrovascular accident" or "costovertebral angle." Embodiments of the present invention which provide the transcriptionist 110 with this ability will now be described.

As mentioned above, when a first phrase representing a first written form of a concept is identified, the editing system 108 may identify a second phrase representing a second written form of the same concept (FIG. 4, step 408). As has now been explained, the second phrase need not be the only alternate written form of the concept represented by the first phrase. Rather, the second phrase may be one of multiple alternate written forms of the concept represented by the first phrase.

Figure 7:
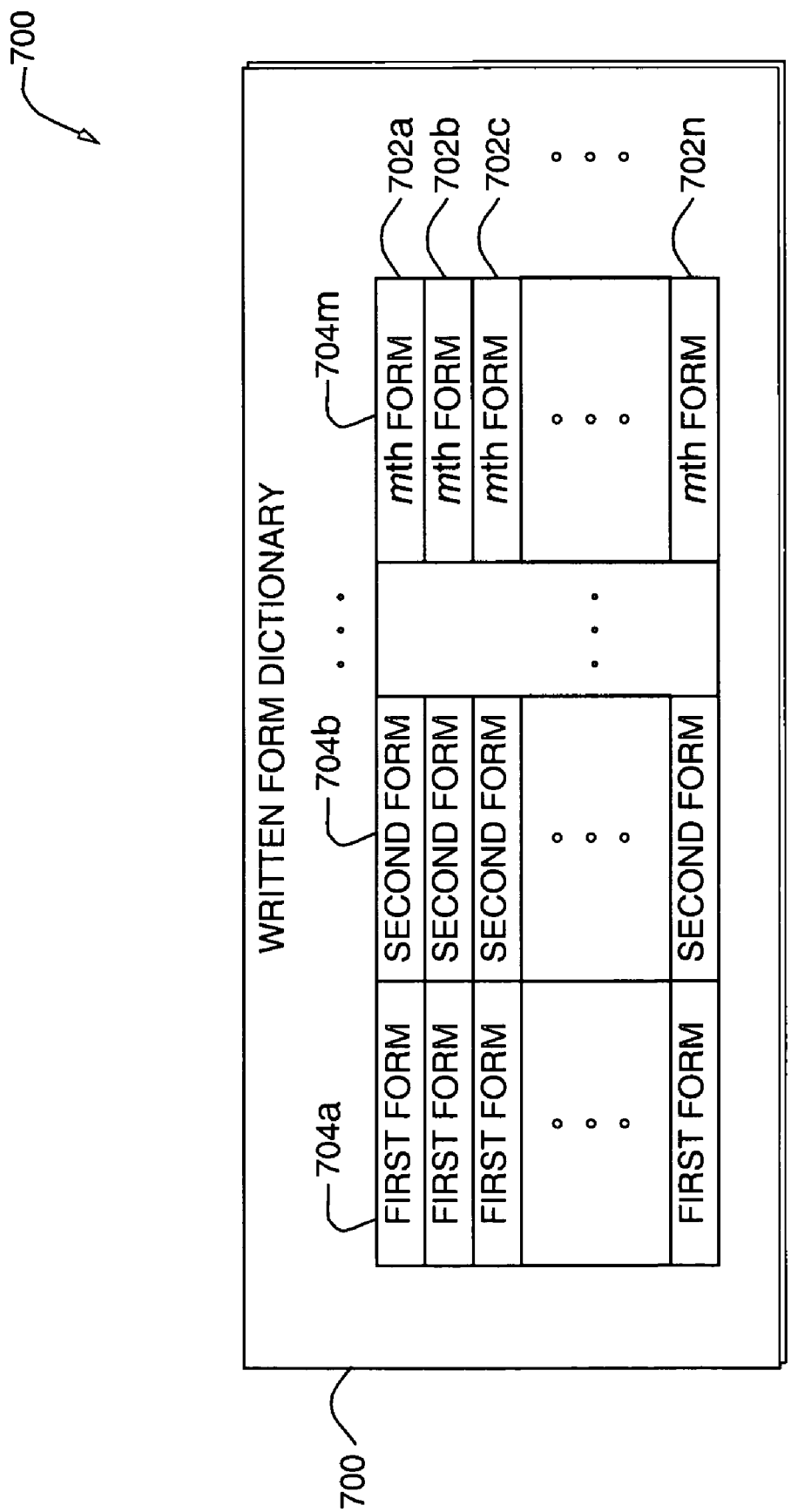
FIG. 7 is a diagram of another written form dictionary for use in embodiments of the present invention.
Figure 8:
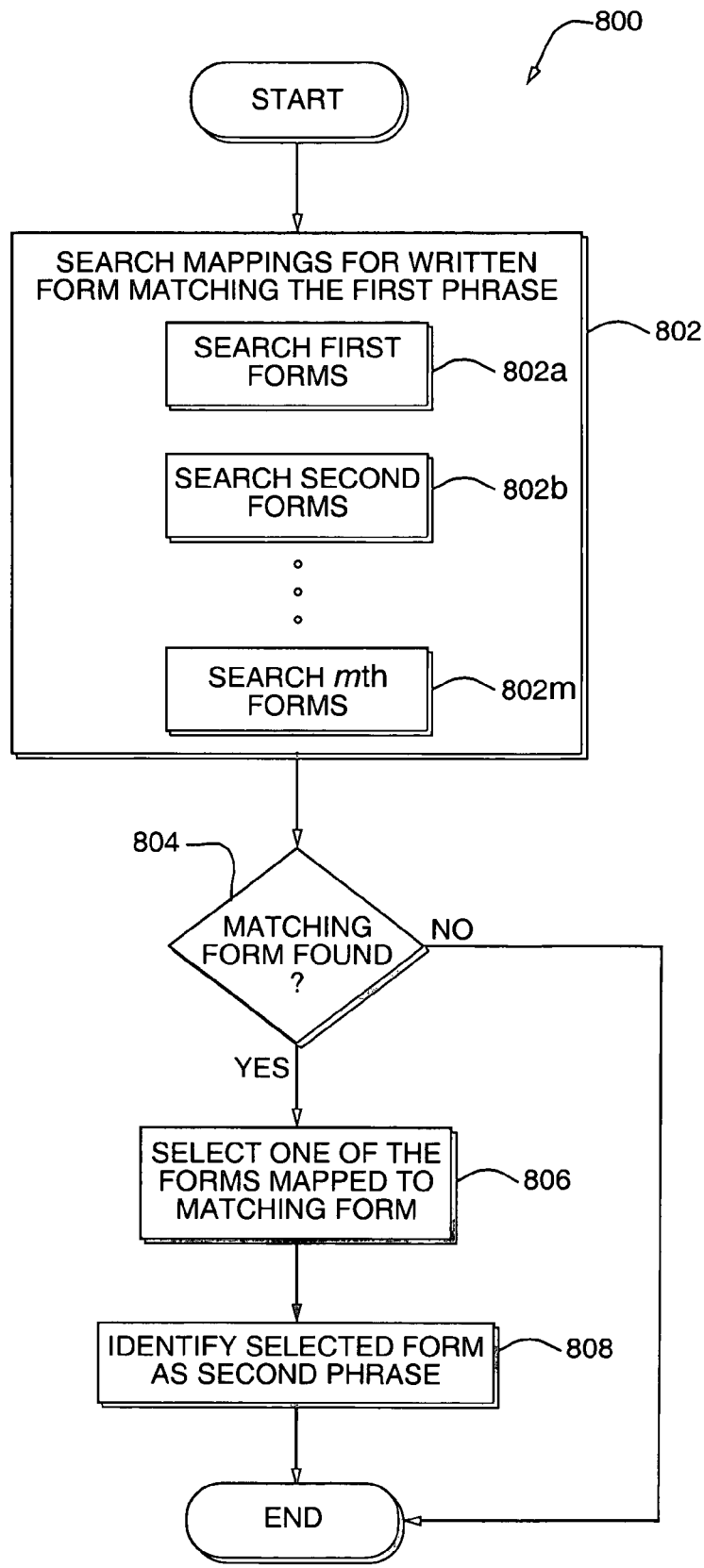
FIG. 8 is a flowchart of a method for using the written form dictionary of FIG. 7 to select replacement text according to one embodiment of the present invention.

Referring to FIG. 7, one embodiment of the editing system 108 is shown which identifies the second phrase 308 using a written form dictionary 700. Referring to FIG. 8, a flowchart is shown of a method used by the editing system 108 to identify the second phrase 308 using the written form dictionary 700, and thereby to implement step 408 of FIG. 4, according to one embodiment of the present invention.

In the example shown in FIG. 7, written form dictionary 700 includes mappings 702a-n, where n may be any number. Each of the mappings 702a-n corresponds to a concept. For purposes of example, assume that mapping 502a corresponds to phrases having the abbreviation "CVA".

Unlike the mappings 502a-n in FIG. 5, the mappings 702a-n in FIG. 7 map more than two written forms to each other. More specifically, each of the mappings 702a-n maps up to m written forms of a concept to each other, as represented by columns 704a-m. Note, however, that each of the mappings 702a-n need not include the same number of written forms. For example, mapping 702a may map three forms (e.g., "CVA" as the first form 704a, "cerebrovascular accident" as the second form 704b, and "costovertebral angle" as the mth form 704m), while mapping 702b map two forms (e.g., "milligrams" as the first form 704a and "mg" as the second form 704b) to each other.

Once the first phrase 306 has been identified (FIG. 4, step 404), the editing system 108 may identify the second phrase 308 as follows. The editing system 108 may search the written form dictionary 700 for a written form that matches the first phrase 306 (FIG. 8, step 802). The editing system 108 may search for a written form that exactly matches the first phrase 306. Alternatively, however, a predetermined minimum degree of required similarity may be defined, and the editing system 108 may search for a written form that has at least the predetermined minimum degree of similarity to the first phrase.

The editing system 108 may perform the search by searching any combination of the written forms of each of the mappings 702a-n (steps 802a-m). For example, the editing system 108 may search only the first written forms 704a in the mappings 702a-n (step 802a), only the second written forms 704b in the mappings 702a-n (step 802b), etc. Alternatively, for example, the editing system 108 may search all written forms 704a-m of the mappings 702a-n.

One benefit of searching through only the first written forms 704a is that it allows different sets of alternatives to be provided to the transcriptionist 110 depending on which written form originally appeared in the draft transcript 106. For example, consider the case in which the written form dictionary 700 includes the following mappings: (1) "CVA", "cerebrovascular accident", "costovertebral angle"; (2) "cerebrovascular accident", "CVA"; and (3) "costovertebral angle", "CVA". If the first written form in each mapping is used as a key into each mapping, then if the abbreviation "CVA" appears in the draft transcript 106, the transcriptionist 110 will be provided with the alternatives "cerebrovascular accident" and "costovertebral angle", because both of these are alternative written forms of "CVA". If, however, the phrase "cerebrovascular accident" appears in the draft transcript 106, the transcriptionist 110 will only be provided with the alternative "CVA", reflecting the fact that "costovertebral angle" is not a valid alternative to "cerebrovascular accident".

More generally, the written form dictionary 700 may be viewed as an undirected and possibly unconnected graph with written forms as nodes and arcs given by the written form mappings 702a-n. When cycling through written forms, the editing system 108 may cycle between all written forms connected directly (through a single graph arc) with the original written form given by the longest match under the text cursor.

Returning to the example of FIG. 8, if a (sufficiently) matching written form is found in the written form dictionary 700 (step 804), then the editing system 108 identifies one of the corresponding written forms to which the matching written form is mapped (step 806). Consider again an example of mapping 702a in which the first form 704a is "CVA", the second form 704b is "cerebrovascular accident", and the mth ($3^{rd}$) form 704m is "costovertebral angle." If the first phrase 306 is "CVA", then the first phrase 306 will match the first form 704a in the mapping 702a in step 802. In such a case, any of the corresponding forms 704b-m in the mapping 702a may be selected as the second phrase 308 (step 808). The editing system 108 may select one of the corresponding forms 704b-m as the second phrase 308 in any of a variety of ways.

For example, the editing system 108 may treat the forms 704a-m in mapping 702a as an ordered list. The editing system 108 may select the next form in the list as the second phrase 308. For example, if the first phrase 306 matches the first form 704a (e.g., "CVA"), the editing system 108 may select the second form 704b (e.g., "cerebrovascular accident") as the second phrase 308. If, however, the first phrase 306 matches the second form 704b (e.g., "cerebrovascular accident"), the editing system 108 may select the third form 704m (e.g., "costovertebral angle") as the second phrase 308 (since, in this example, m=3). If the first phrase 306 matches the mth form 704m (e.g., "costovertebral angle"), the editing system 108 may select the first form 704a (e.g., "CVA" ) as the second phrase 308.

In practice, this technique enables the transcriptionist 110 to cycle through alternative forms and to select one of them to replace the first phrase 306. Recall that the transcriptionist 110 may select the second phrase 308 by placing a text cursor within the first phrase and hitting a predetermined hotkey. By repeatedly pressing the hotkey, the transcriptionist 110 may cycle through alternative forms of the first phrase 306 until a desired replacement is found.

Note that in the case where the first phrase 306 matches a written form in a mapping having only two applicable alternate forms, cycling through alternate forms may have the effect of toggling between the two applicable alternate forms. For example, if the two applicable alternate forms are "CVA" and "cerebrovascular accident," repeatedly pressing the hotkey will cause the editing system 108 to toggle between the phrases "CVA" and "cerebrovascular accident" in the draft transcript 106.

The editing system 108 may select one of the corresponding forms 704*b-m* as the second phrase 308 in other ways. For example, if there are multiple alternate written forms for the first form 704*a*, the editing system 108 may display a list of all of the alternatives (e.g., "cerebrovascular accident" and "costovertebral angle") to the transcriptionist 110, and enable the transcriptionist 110 to select one of the alternatives in the list as the second phrase 308.

Furthermore, the editing system 108 may limit the number of alternate written forms made available to the transcriptionist 110 based on the context of the first phrase 306 in the draft transcript 106. For example, certain forms may be marked as suitable for use only in certain contexts (e.g., certain sections of the draft transcript 106). If the first phrase 306 matches the first form 704*a* in the mapping 702*a*, but the second form 704*b* in the mapping 702*a* is marked as not suitable for use in the same context as the context of the first phrase 306 in the draft transcript 106, the editing system 108 may not provide the second form 704*b* as an alternative to the transcriptionist 110.

As described above with respect to FIG. 4, once the editing system 108 has identified the second phrase 308, the editing system 108 may replace the first phrase 306 with the second phrase 308 in the draft transcript 106, thereby producing the edited transcript 308 (step 410).

Among the advantages of the invention are one or more of the following. Embodiments of the present invention may be used to decrease the time and effort required by the transcriptionist 110 to edit the draft transcript 106 and thereby to produce the edited transcript 112. Time and effort are reduced because the transcriptionist 110 need not manually type corrections to text in the draft transcript 106. Instead, the transcriptionist 110 may make such corrections simply by identifying the text to be modified and by issuing an instruction to replace that text with an alternate written form of the same concept. The instruction itself need not contain the replacement text. The transcriptionist 110 may perform such actions using one or a small number of gestures, such as a single mouse click to identify the text to be modified and a single keystroke to issue the replacement instruction.

In addition to reducing the number of physical gestures performed by the transcriptionist 110, the techniques disclosed herein also reduce the burden on the transcriptionist 110 to remember and identify the replacement text. In a conventional system, if the transcriptionist 110 sees the phrase "cerebrovascular accident" and recognizes that it needs to be replaced with an abbreviation, the transcriptionist 110 may need to remember that the correct replacement abbreviation is "CVA," rather than "CV" or "CA." The techniques disclosed herein may reduce or eliminate the need for the transcriptionist 110 to remember the correct replacement text. If, for example, the written form dictionary contains a single mapping from the expanded form "cerebrbvascular accident" to the abbreviation "CVA," then the transcriptionist 110 may simply select the expanded form and issue the replacement instruction, in response to which the editing system 108 may automatically replace the expanded form with the correct abbreviation. Even in cases where there are more than two alternate written forms of a particular concept, the system's ability to display the available alternatives to the transcriptionist 110 reduces the burden on the transcriptionist 110 to remember such alternatives and to select the correct one for use as replacement text.

Because the techniques disclosed herein may be used in conjunction with draft transcripts generated by automatic speech recognizers, the time and effort required by the transcriptionist 110 are further reduced in comparison to systems requiring the transcriptionist 110 to manually transcribe the spoken audio stream 102.

Because the techniques disclosed herein may be used to make changes to individual phrases as they are being observed by the transcriptionist, such techniques are suitable for use in conventional document transcription workflows. Unlike a conventional word processor global search and replace function, for example, the techniques disclosed herein do not require changes to be made out-of-sequence in the transcript. Furthermore, the transcriptionist 110 may identify text requiring correction while viewing the document in sequence, and while listening to the corresponding audio stream 102. Such techniques may therefore be seamlessly integrated into conventional document transcription workflows.

The techniques disclosed herein may select potential and actual replacement text (e.g., the second phrase 308) based not only on the text to be replaced (e.g., the first phrase 306) but also on the context of such text in the draft transcript 106. For example, the set of available alternate written forms may differ depending on the section of the draft transcript 106 in which the first phrase 306 appears. This simplifies the transcriptionist's task, because it limits the number of alternatives the transcriptionist 110 needs to consider, and reduces the likelihood that the transcriptionist 110 will select the wrong replacement text by preventing the transcriptionist 110 from selecting replacement text that has been determined not to be appropriate for the current context.

Furthermore, the techniques disclosed herein may improve the overall quality of the resulting edited transcript 112, such as by facilitating adherence to formatting instructions and compliance with best practices. For example, the transcriptionist 110 may be presented with only those alternate written forms that adhere to formatting instructions or that comply with best practices. Presentation of such alternate written forms to the transcriptionist 110 reduces the burden on the transcriptionist 110 to remember which alternate written forms comply with the formatting instructions and/or best practices, and thereby increases the likelihood that such formatting instructions and/or best practices will be followed.

The techniques disclosed herein may be used not only to replace abbreviations with their expanded forms, but also to replace expanded forms with their abbreviations. This feature is beneficial because, for example, an abbreviated written form of a concept may be appropriate for use in a certain context, while an expanded written form of the same concept may be appropriate for use in a different context. The techniques disclosed herein enable the transcriptionist 110 to make replacements in either direction easily depending on the current context and/or other considerations.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain examples provided herein involve mappings between an abbreviation and an expanded form of a concept, alternate written forms of a concept need not be in an abbreviation-expanded form relationship. Rather, the techniques disclosed herein may be used in conjunction with mappings between any two or more written forms of a concept. Examples of such mappings include alternate spellings of the same concept and a concept expressed in different languages.

Although certain examples provided herein involve documents generated by a speech recognizer, this is not a requirement of the present invention. Rather, the techniques disclosed herein may be applied to any kind of document, regardless of how it was generated. Such techniques may, for example, be used in conjunction with documents typed using conventional text editors.

Mappings between alternate written forms of a concept need not be bidirectional. For example, "cerebrovascular accident" may map to "CVA", but "CVA" need not map to "cerebrovascular accident."

Furthermore, the same phrase may be a written form of multiple concepts. Consider, for example, the case in which the written form dictionary includes the mappings ("cerebrovascular accident", "CVA") and ("CVA", "costovertebral angle"). This is an example in which a single phrase ("CVA") is a written form of multiple concepts ("cerebrovascular accident" and "costovertebral angle"). In this case, the editing system 108 may identify a list of alternative written forms of both concepts, such as {"cerebrovascular accident", "CVA", "costovertebral angle"}. Note that this list includes written forms of multiple concepts. The transcriptionist 110 may be presented with this list of alternative written forms from which to select as the replacement text.

As described above, the transcriptionist 110 may select the first phrase 306 without fully specifying it. For example, the transcriptionist 110 may select the first phrase 306 by placing a text cursor within the first phrase 306. In such a case, the editing system 108 needs to identify the first phrase 306 based on the position of the cursor. The editing system 108 may do this in a variety of ways. Assume for purposes of example that the transcriptionist 110 places the cursor after the "t" in "cerebrovascular accident." The editing system 108 may attempt to identify the first phrase 306 by expanding the text selection outward from the cursor position until a complete word (i.e., "accident") is identified. The editing system 108 may then attempt to find a match for the identified word in the mappings.

If no match is found, the editing system 108 may expand the text selection (e.g., to "cerebrovascular accident") until a match is found in the written form dictionary, or until the text selection includes some predetermined maximum number of words (e.g., five). As an alternative, the editing system 108 may identify the longest phrase in the written form dictionary that includes the selected text as the first phrase. If multiple matches are found, the editing system 108 may, for example, select one of the matches randomly as the first phrase 306.

The term "concept" as used herein includes, for example, dates, times, numbers, codes, medications, medical history, diagnoses, prescriptions, phrases, enumerations, and section cues. A concept may be spoken and written in a variety of ways. Each way of speaking a particularly concept is referred to herein as a "spoken form" of the concept. Each way of writing a particular concept is referred to herein as a "written form" of the concept. A distinction is sometimes made between "semantic" concepts and "syntactic" concepts. The term "concept" as used herein includes both semantic concepts and syntactic concepts, but is not limited to either and does not rely on any particular definition of "semantic concept" or "syntactic concept" or on any distinction between the two.

The spoken audio stream may be any audio stream, such as a live audio stream received directly or indirectly (such as over a telephone or IP connection), or an audio stream recorded on any medium and in any format. In distributed speech recognition (DSR), a client performs preprocessing on an audio stream to produce a processed audio stream that is transmitted to a server, which performs speech recognition on the processed audio stream. The audio stream 302 may, for example, be a processed audio stream produced by a DSR client.

The invention is not limited to any of the described domains (such as the medical and legal fields), but generally applies to any kind of documents in any domain. Furthermore, documents used in conjunction with embodiments of the present invention may be represented in any machine-readable form. Such forms include plain text documents and structured documents represented in markup languages such as XML. Such documents may be stored in any computer-readable medium and transmitted using any kind of communications channel and protocol.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for use with a document tangibly stored in a first computer-readable medium, the method comprising:
   (A) accessing the first computer-readable medium to identify a first phrase within the document, the first phrase representing a first written form of a concept;
   (B) identifying a two-way mapping between the first phrase and a second phrase tangibly stored in a second computer-readable medium, the second phrase representing a second written form of the concept;
   (C) replacing the first phrase with the second phrase in the document on the first computer-readable medium;
   (D) after (C), replacing the second phrase with the first phrase in the document on the first computer-readable medium;
   (E) before (C), receiving an instruction from a user to modify the first phrase;
   wherein (C) is performed in response to receipt of the instruction; and
   wherein the instruction does not include the second phrase.

2. The method of claim 1, wherein the instruction comprises an instruction generated by the user using a single keystroke.

3. The method of claim 1, further comprising:
   (F) generating at least part of the document using an automatic speech recognizer, the at least part of the document including the first phrase.

4. An apparatus for use with a document tangibly stored in a first computer-readable medium, the apparatus comprising:
   means for identifying a first phrase within the document, the first phrase representing a first written form of a concept;
   means for identifying a two-way mapping between the first phrase and a second phrase tangibly stored in a second computer-readable medium, the second phrase representing a second written form of the concept;
   means for receiving an instruction from a user to modify the first phrase, wherein the instruction does not include the second phrase;
   means for replacing the first phrase with the second phrase in the document in response to receipt of the instruction; and
   means for replacing the second phrase with the first phrase in the document.

5. A computer-implemented method for use with a document tangibly stored in a first computer-readable medium, the method comprising:
   (A) accessing the first computer-readable medium to identify a first phrase within the document, the first phrase representing a first written form of a concept;
   (B) determining whether a plurality of text keys tangibly stored in a second computer-readable medium includes a matching text key having at least a predetermined degree of similarity to the first phrase; and
   (C) if the plurality of text keys is determined to include the matching text key, then:
      (i) accessing the second computer-readable medium to identify a text value associated with the text key; and
      (ii) replacing the first phrase with the text value in the document on the first computer-readable medium;
   (D) after (C), replacing the text value with the matching first phrase in the document on the first computer-readable medium; and
   (E) before (B), receiving an instruction from a user to modify the first phrase;
   wherein (B) and (C) are performed in response to receipt of the instruction; and
   wherein the instruction does not include the text value.

6. The method of claim 5, wherein the instruction comprises an instruction generated by the user using a single keystroke.

7. The method of claim 5, further comprising:
   (F) generating at least part of the document using an automatic speech recognizer, the at least part of the document including the first phrase.

8. The method of claim 5, wherein (C) (i) comprises accessing the second computer-readable medium to identify the text value based on a context of the first phrase in the document.

9. The method of claim 5, wherein (C) (i) comprises identifying the second computer-readable medium to identify a text value from among a plurality of text values associated with the text key.

10. An apparatus for use with a document tangibly stored in a first computer-readable medium, the apparatus comprising:
    means for identifying a first phrase within the document, the first phrase representing a first written form of a concept;
    means for receiving an instruction from a user to modify the first phrase;
    means for determining, in response to receipt of the instruction, whether a plurality of text keys tangibly stored in a second computer-readable medium includes a matching text key having at least a predetermined degree of similarity to the first phrase;
    means for identifying, in response to receipt of the instruction, a text value associated with the text key and replacing the first phrase with the text value in the document if the plurality of text keys is determined to include the matching text key; and
    means for replacing the text value with the matching first phrase in the document after replacing the first phrase with the text value;
    wherein the instruction does not include the text value.

11. A computer-implemented method comprising:
    (A) identifying a first phrase, the first phrase representing an expanded written form of a concept;
    (B) receiving an instruction from a user to modify the first phrase;
    (C) in response to receipt of the instruction, identifying a second phrase representing an abbreviated written form of the concept; and
    (D) replacing the first phrase with the second phrase;
    and (E) after (D), replacing the second phrase with the first phrase; wherein the instruction does not include the second phrase.

12. The method of claim 11, wherein the instruction comprises an instruction generated by the user using a single keystroke.

13. The method of claim 11, wherein the first phrase comprises a first phrase in a document, and wherein (D) comprises replacing the first phrase with the second phrase in the document.

14. The method of claim 13, further comprising:
    (E) generating at least part of the document using an automatic speech recognizer, the at least part of the document including the first phrase.

15. The method of claim 13, wherein (C) comprises identifying the second phrase based on a context of the first phrase in the document.

16. The method of claim 11, wherein (D) comprises identifying a second phrase from among a plurality of second phrases representing the concept.

17. An apparatus comprising:

means for identifying a first phrase, the first phrase representing an expanded written form of a concept;

means for receiving an instruction from a user to modify the first phrase;

means for identifying a second phrase representing an abbreviated written form of the concept in response to receipt of the instruction; and means for replacing the first phrase with the second phrase;

and means for replacing the second phrase with the first phrase after replacing the first phrase with second phrase; wherein the instruction does not include the second phrase.

\* \* \* \* \*

UNITED STATES PATENT AND TRADEMARK OFFICE
CERTIFICATE OF CORRECTION

PATENT NO.         : 7,831,423 B2
APPLICATION NO.    : 11/440950
DATED              : November 9, 2010
INVENTOR(S)        : Kjell Schubert et al.

It is certified that error appears in the above-identified patent and that said Letters Patent is hereby corrected as shown below:

In column 9, line 38, after "modified" insert -- , --.

In column 9, lines 57-58, delete ""cerebrbvascular accident"" and insert -- cerebrovascular accident --, therefor.

In column 13, line 45, in Claim 4, after "with" delete "the".

Signed and Sealed this
Twenty-second Day of March, 2011

David J. Kappos
*Director of the United States Patent and Trademark Office*